United States Patent
Xia et al.

(10) Patent No.: US 9,622,096 B2
(45) Date of Patent: Apr. 11, 2017

(54) METHOD AND DEVICE FOR SUBSCRIBING TO RADIO LINK FAILURE REPORT

(71) Applicant: Huawei Technologies Co., Ltd., Shenzhen (CN)

(72) Inventors: Haitao Xia, Beijing (CN); Dong Zhao, Shanghai (CN); Lan Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 14/168,724

(22) Filed: Jan. 30, 2014

(65) Prior Publication Data

US 2014/0148151 A1 May 29, 2014

Related U.S. Application Data

(63) Continuation of application No. PCT/CN2012/076741, filed on Jun. 12, 2012.

(30) Foreign Application Priority Data

| Aug. 2, 2011 | (CN) | 2011 1 0219526 |
| Sep. 26, 2011 | (CN) | 2011 1 0288467 |

(51) Int. Cl.
*H04W 24/00* (2009.01)
*H04W 24/04* (2009.01)
(Continued)

(52) U.S. Cl.
CPC ......... *H04W 24/04* (2013.01); *H04L 41/0604* (2013.01); *H04L 43/04* (2013.01); *H04L 43/06* (2013.01); *H04W 24/10* (2013.01)

(58) Field of Classification Search
CPC ... H04W 24/04; H04W 24/02; H04W 76/048; H04W 52/0209; H04W 16/28;
(Continued)

(56) References Cited

U.S. PATENT DOCUMENTS

| 6,708,216 B1 | 3/2004 | Lee |
| 2008/0288966 A1* | 11/2008 | Maes .................. H04M 7/006 719/328 |

(Continued)

FOREIGN PATENT DOCUMENTS

| CN | 101051933 A | 10/2007 |
| CN | 101489209 A | 7/2009 |

(Continued)

OTHER PUBLICATIONS

Huawei, "UE RLF report," 3GPP TSG-RAN WG2 Meeting #69, R2-101265, Feb. 22-26, 2010, 3 pages.
(Continued)

*Primary Examiner* — Fred Casca
(74) *Attorney, Agent, or Firm* — Slater Matsil, LLP

(57) ABSTRACT

Embodiments of the present invention provide a method and device for subscribing to an RLF report. An integration reference point manager configures a subscription condition for an RLF report for an integration reference point agent. The integration reference point manager obtains an RLF report that is sent by the integration reference point agent and satisfies the subscription condition. The embodiments of the present invention can avoid the case in the prior art that a base station sends an RLF report obtained from a UE, to an IRPManager through an IRPAgent in a best-effort mode, thereby decreasing the load of information transferred between the IRPManager and the IRPAgent.

4 Claims, 2 Drawing Sheets

(51) Int. Cl.
*H04W 24/10* (2009.01)
*H04L 12/26* (2006.01)
*H04L 12/24* (2006.01)

(58) Field of Classification Search
CPC . H04W 36/14; H04W 16/18; H04W 28/0221; H04W 40/02; H04W 52/00; H04W 76/023; H04W 76/025; H04W 24/08; H04W 76/02; H04W 36/0088; H04W 84/045
USPC ..... 455/423, 438, 450, 560, 67.11; 370/216, 370/242, 252, 332
See application file for complete search history.

(56) References Cited

U.S. PATENT DOCUMENTS

| | | | |
|---|---|---|---|
| 2011/0061063 A1* | 3/2011 | Suerbaum | H04L 41/0806 719/316 |
| 2011/0312306 A1* | 12/2011 | Wu | H04W 24/10 455/414.1 |
| 2012/0208598 A1 | 8/2012 | Xia | |
| 2014/0220953 A1 | 8/2014 | Xia | |
| 2014/0295840 A1* | 10/2014 | Keskitalo | H04W 36/0061 455/436 |
| 2014/0348005 A1 | 11/2014 | Futaki et al. | |

FOREIGN PATENT DOCUMENTS

| | | |
|---|---|---|
| CN | 101883381 A | 11/2010 |
| CN | 102004649 A | 4/2011 |
| CN | 102045819 A | 5/2011 |
| CN | 102055595 A | 5/2011 |
| CN | 02131257 A | 7/2011 |
| CN | 102131257 A | 7/2011 |
| JP | 2012513707 A | 6/2012 |
| JP | 2013509054 A | 3/2013 |
| JP | 2013509756 A | 3/2013 |
| WO | 2007091858 A2 | 8/2007 |
| WO | 2010034200 A1 | 4/2010 |
| WO | 2010074630 A1 | 7/2010 |
| WO | 2011047599 A1 | 4/2011 |
| WO | 2011050846 A1 | 5/2011 |
| WO | 2011083801 A1 | 7/2011 |

OTHER PUBLICATIONS

"3rd Generation Partnership Project; Technical Specification Group Services and System Aspects; Telecommunication management; Subscriber and equipment trace; Trace control and configuration management (Release 11)," 3GPP TS 32.422, V11.2.0, Dec. 2011, 120 pages.
"The RLF Report Applicability of EPLMN," Change Request, 37.300 CR CRNum, Revision, Current Version: 10.4.0, 3GPP TSG-WG2, Meeting #75, R2-114013, Athens, Greece, Aug. 22-26, 2011, 2 pages.
"Additional MDT UE Measurement Collection Requirements," Source: Alcatel-Lucent, Document for: Discussion and Approval, Agenda Item: 6.5.3, 3GPP TSG-SA5 (Telecom Management), Meeting SA5#73, S5-102555, New Delhi India, Aug. 23-27, 2010, 4 pages.
"Add RLF as an Explicit Reporting and Collection Trigger for the Node Configurable by the Operator," Change Request, 32.422 CR 119, Revision, Current Version: 10.3.0, 3GPP TSG-SA5 (Telecom Management), S5-111793, SA5#77, Shenzhen, China, May 9-14, 2011, 2 pages.
3rd Generation Partnership Project; Technical Specification Group Services and System Aspects; Telecommunication management; Notification Log (NL) Integration Reference Point (IRP); Information Service (IS) (Release 10), 3GPP TS 32.332 V10.0.0, Mar. 2011, 29 pages.
3rd Generation Partnership Project; Technical Specification Group Services and System Aspects; Telecommunication management; File Transfer (FT) Integration Reference Point (IRP); Information Service (IS) (Release 10), 3GPP TS 32.342 V10.0.0, Mar. 2011, 20 pages.
3rd Generation Partnership Project; Technical Specification Group Services and System Aspects; Telecommunication management; Subscriber and equipment trace; Trace concepts and requirements (Release 10) 3GPP TS 32.421 V10.2.0, Mar. 2011, 34 pages.
3rd Generation Partnership Project; Technical Specification Group Services and System Aspects; Telecommunication management; Subscriber and equipment trace; Trace control and configuration management (Release 11), 3GPP TS 32.422 V11.0.0, Jun. 2011, 115 pages.
3rd Generation Partnership Project; Technical Specification Group Services and System Aspects; Telecommunication management; Trace Management; Integration Reference Point (IRP); Requirements (Release 10), 3GPP TS 32.441 V10.1.0, Mar. 2011, 15 pages.
3rd Generation Partnership Project; Technical Specification Group Services and System Aspects; Telecommunication management; Trace Management Integration Reference Point (IRP); Information Service (IS) (Release 11), 3GPP TS 32.442 V11.0.0, Jun. 2011, 28 pages.
Chinese Office Action received in Application No. 201110288467.7 mailed Sep. 4, 2013, 7 pages.
International Search Report and Written Opinion received in Application No. PCT/CN2012/076741 mailed Sep. 13, 2012, 11 pages.
Ericsson, "RLF reporting in MDT trace," 3GPP TSG-SA5 (Telecom Management) S5-112433, Meeting SA5#78, Aug. 22-26, 2011, 3 pages.
"3rd Generation Partnership Project; Technical Specification Group Services and System Aspects; Telecommunication management; Integration of device management information with Itf-N (Release 10)," 3GPP TR 32.827, V10.1.0, Jun. 2010, 24 pages.
Huawei, "Discussion on subscribing RLF reports over Itf-N," 3GPP TSG SA WG5 (Telecom Management) Meeting #81, Agenda Item: 6.5.2, Feb. 6-10, 2012, 4 pages.
Huawei, "Add subscription requirements for RLF reporting," 3GPP TSG-SA5 (Telecom Management), SA5#81, S5-120197, Change Request 32.441 CR 0013, Current version: 11.0.0, Feb. 6-10, 2012, 2 pages.
3GPP YSG-RAN2, "Relply LS on Managing RLF Reporting Within MDT," 3GPP TSG RAN WG2 Meeting #73bis, U-112638, Apr. 11-15, 2011, pp. 1-2, Shanghai, China.

* cited by examiner

METHOD AND DEVICE FOR SUBSCRIBING TO RADIO LINK FAILURE REPORT

This application is a continuation of International Application No. PCT/CN2012/076741, filed on Jun. 12, 2012, which claims priority to Chinese Patent Application No. 201110219526.5, filed on Aug. 2, 2011 and Chinese Patent Application No. 201110288467.7, filed on Sep. 26, 2011, all of which are hereby incorporated by reference in their entireties.

TECHNICAL FIELD

Embodiments of the present invention relate to communication technologies, and in particular, to a method and device for subscribing to a radio link failure report.

BACKGROUND

A radio link failure (RLF) is an abnormal link scenario that occurs on an air interface of a radio access network. When an RLF occurs on a user equipment (UE) in an active state in a current cell (that is, a source cell), the UE generates an RLF report, performs cell reselection, and initiates a radio resource control (RRC) connection reestablishment procedure to a base station (that is, a target base station) controlling a selected cell (that is, a target cell). By using RRC Connection Reestablishment Complete message, the UE may instruct the target base station to obtain the RLF report. After obtaining the RLF report, the target base station may send the RLF report to a base station controlling the source cell (that is, a source base station).

However, because the source base station or the target base station may send the RLF report obtained from the UE to an integration reference point manager (IRPManager) through an integration reference point agent (IRPAgent) in a best-effort mode, the load of RLF report information transferred between the IRPManager and the IRPAgent is heavy.

SUMMARY OF THE INVENTION

Embodiments of the present invention provide a method and device for subscribing to an RLF report, so as to decrease the load of information transferred between an IRPManager and an IRPAgent.

In a first preferred aspect, the present invention provides a method for subscribing to an RLF report, including configuring, by an IRPManager, a subscription condition for an RLF report, for an IRPAgent. The IRPManager obtains an RLF report that is sent by the IRPAgent and satisfies the subscription condition.

In a first preferred implementation of the first preferred aspect, configuring the subscription condition for the RLF report includes invoking, by the IRPManager, a Create Management Object operation for the IRPAgent, for requesting the IRPAgent to create an RLF report subscription subcategory of a subnet category or a base station function category. The IRPManager invokes a Set Management Object Attributes operation for the IRPAgent, for requesting the IRPAgent to configure an attribute of the created RLF report subscription subcategory to a value of an attribute corresponding to the subscription condition.

In a second preferred implementation of the first preferred implementation of the first preferred aspect, a mechanism of obtaining the RLF report that is sent by the IRPAgent by the IRPManager and satisfying the subscription condition includes a file transfer mechanism.

In a third preferred implementation of the first preferred aspect, the configuring, by the IRPManager, the subscription condition for the RLF report, for the IRPAgent includes invoking a Subscribe Log operation for the IRPAgent by the IRPManager, for subscribing to the RLF report from the IRPAgent, where a filter condition of the Subscribe Log operation is the subscription condition.

In a fourth preferred implementation of the third preferred implementation of the first preferred aspect, a mechanism of obtaining, by the IRPManager, the RLF report that is sent by the IRPAgent and satisfies the subscription condition includes a notification log mechanism.

In a fifth preferred implementation of the first preferred aspect, the configuring, by the IRPManager, the subscription condition for the RLF report, for the IRPAgent includes invoking, by the IRPManager, an Activate Signaling Trace Job operation for the IRPAgent, for requesting the IRPAgent to generate a signaling trace job. A job type of the signaling trace job is RLF reporting only. An input parameter of the Activate Signaling Trace Job operation is a value of an attribute corresponding to the subscription condition.

In a sixth preferred implementation of the fifth preferred implementation of the first preferred aspect, a mechanism of obtaining, by the IRPManager, the RLF report that is sent by the IRPAgent and satisfies the subscription condition includes a trace result reporting mechanism of a signaling trace job or a trace result reporting mechanism of a minimized drive test MDT job.

In a seventh preferred implementation of any one of the implementations of the first preferred aspect above, the attribute corresponding to the subscription condition includes at least one of the following: area scope; time duration; RLF occurrence frequency; user equipment (UE) measurement item threshold; job identifier information of a signaling trace job or an MDT job in which an RLF occurs; and identifier information of a UE in a signaling trace job or an MDT job in which an RLF occurs.

In an eighth preferred implementation of the seventh implementation of the first preferred aspect, when the attribute is the area scope, the value of the attribute includes at least one of the following: an identifier of one or more cells, or a tracking area identifier, or a routing area identifier, or a location area identifier.

In a ninth preferred implementation of any one of the seventh implementation of the first preferred aspect and the eighth implementation of the first preferred aspect, the subscription condition corresponding to the attribute is: when an RLF occurs on a UE in an area indicated by the attribute, an RLF report needs to be reported.

In a tenth preferred implementation of the seventh implementation of the first preferred aspect, when the attribute is the time duration, the attribute is marked by start time and end time of absolute time, or marked by start time of absolute time and a duration.

In an eleventh preferred implementation of any one of the seventh implementation of the first preferred aspect and the tenth implementation of the first preferred aspect, the subscription condition corresponding to the attribute is: when an RLF occurs in the time duration indicated by the attribute, an RLF report needs to be reported.

In a twelfth preferred implementation of the seventh implementation of the first preferred aspect, when the attribute is the RLF occurrence frequency, the attribute is marked by a duration and the amount of RLF occurrences.

In a thirteenth preferred implementation of any one of the seventh implementation of the first preferred aspect and the twelfth implementation of the first preferred aspect, the subscription condition corresponding to the attribute is: when an actual RLF occurrence frequency is higher than or equal to a frequency indicated by the attribute, an RLF report needs to be reported.

In a fourteenth preferred implementation of the seventh implementation of the first preferred aspect, when the attribute is the UE measurement item threshold, a value of the attribute includes at least one of the following: a threshold of cell reference signal received power (RSRP) and a threshold of cell reference signal received quality (RSRQ).

In a fifteenth preferred implementation of any one of the seventh implementation of the first preferred aspect and the fourteenth implementation of the first preferred aspect, the subscription condition corresponding to the attribute is: when a measured value of a UE measurement item is non-compliant with a threshold indicated by the attribute, an RLF report needs to be reported.

In a sixteenth preferred implementation of the seventh implementation of the first preferred aspect, when the attribute is job identifier information of a signaling trace job or an MDT job in which an RLF occurs, the subscription condition corresponding to the attribute is: when an RLF occurs in a signaling trace job or an MDT job indicated by the attribute, an RLF report needs to be reported. When the attribute is identifier information of a UE in a signaling trace job or an MDT job in which an RLF occurs, the subscription condition corresponding to the attribute is: when a UE on which an RLF occurs is a UE indicated by the attribute, an RLF report needs to be reported.

In a seventeenth preferred implementation of any one of the seventh implementation of the first preferred aspect and the sixteenth implementation of the first preferred aspect, the job identifier information is a trace reference value (TR). The identifier information of the UE includes a combination of a TR and a trace recording session reference value (TRSR), or includes a combination of a TR, a TRSR, and a cell identifier.

In a second aspect, the present invention provides a method for subscribing to an RLF report. An IRPAgent configures a subscription condition for an RLF report subscribed to by an IRPManager. The IRPAgent obtains, according to the subscription condition, an RLF report that satisfies the subscription condition. The IRPAgent sends the RLF report that satisfies the subscription condition to the IRPManager.

In a first preferred implementation of the second preferred aspect, the IRPAgent configures the subscription condition by creating, by the IRPAgent, according to a Create Management Object operation invoked by the IRPManager, an RLF report subscription subcategory of a subnet category or a base station function category. The IRPAgent configures according to a Set Management Object Attributes operation invoked by the IRPManager, an attribute of the created RLF report subscription subcategory to a value of an attribute corresponding to the subscription condition.

In a second preferred implementation of the second preferred aspect, the IRPAgent configures the subscription condition by subscribing to the RLF report for the IRPManager according to a Subscribe Log operation invoked by the IRPManager, and configuring a filter condition of the Subscribe Log operation to the subscription condition.

In a third preferred implementation of the second preferred aspect, the IRPAgent configures the subscription condition by generating a signaling trace job according to an Activate Signaling Trace Job operation invoked by the IRPManager. A job type of the signaling trace job is RLF reporting only, and configuring a value of an attribute corresponding to the subscription condition as an input parameter of the Activate Signaling Trace Job operation.

In a fourth preferred implementation of the second preferred aspect, the IRPAgent obtains the RLF report by querying according to the subscription condition, an obtained RLF report sent by a base station in an administrative domain of the IRPAgent, and obtaining the RLF report that satisfies the subscription condition. Alternatively, the IRPAgent obtains the RLF report by subscribing, according to the subscription condition, from a base station that satisfies the subscription condition in an administrative domain of the IRPAgent, and obtaining the RLF report that satisfies the subscription condition.

In a fifth preferred implementation of any one of the first and fourth implementation of the second preferred aspect, a mechanism of sending, by the IRPAgent, the RLF report that satisfies the subscription condition to the IRPManager includes a file transfer mechanism.

In a sixth preferred implementation of any one of the second and fourth implementation of the second preferred aspect, a mechanism of sending, by the IRPAgent, the RLF report that satisfies the subscription condition to the IRPManager includes a notification log mechanism.

In a seventh preferred implementation of any one of the third and fourth implementation of the second preferred aspect, a mechanism of sending, by the IRPAgent, the RLF report that satisfies the subscription condition to the IRPManager includes a trace result reporting mechanism of a signaling trace job or a trace result reporting mechanism of a minimized drive test MDT job.

In an eighth preferred implementation of any one of the implementations of the second preferred aspect above, the attribute corresponding to the subscription condition includes at least one of the following: area scope; time duration; RLF occurrence frequency; user equipment (UE) measurement item threshold; job identifier information of a signaling trace job or an MDT job in which an RLF occurs; and identifier information of a UE in a signaling trace job or an MDT job in which an RLF occurs.

In a ninth preferred implementation of the eighth implementation of the second preferred aspect, a value of the attribute includes at least one of the following: an identifier of one or more cells, or a tracking area identifier, or a routing area identifier, or a location area identifier when the attribute is an area scope. Alternatively, when the attribute is a time duration, the attribute is marked by start time and end time of absolute time, or marked by start time of absolute time and a duration. When the attribute is an RLF occurrence frequency, the attribute is marked by a duration and the amount of RLF occurrences. When the attribute is a UE measurement item threshold, a value of the attribute includes at least one of the following: a threshold of cell reference signal received power (RSRP) and a threshold of cell reference signal received quality (RSRQ).

In a tenth preferred implementation of the ninth implementation of the second preferred aspect, the subscription condition corresponding to the attribute includes any one of the following. When the attribute is an area scope, the subscription condition corresponding to the attribute is: when an RLF occurs on a UE in an area indicated by the attribute, an RLF report needs to be reported. When the attribute is a time duration, the subscription condition corresponding to the attribute is: when an RLF occurs in a time duration indicated by the attribute, an RLF report needs to be reported. When the attribute is an RLF occurrence frequency, the subscription condition corresponding to the attribute is: when an actual RLF occurrence frequency is higher than or equal to a frequency indicated by the attribute, an RLF report needs to be reported. When the attribute is a UE measurement item threshold, the subscription condition corresponding to the attribute is: when a measured value of a UE measurement item is non-compliant with a threshold indicated by the attribute, an RLF report needs to be reported. When the attribute is job identifier information of a signaling trace job or an MDT job in which an RLF occurs, the subscription condition corresponding to the attribute is: when an RLF occurs in a signaling trace job or an MDT job indicated by the attribute, an RLF report needs to be reported. When the attribute is identifier information of a UE in a signaling trace job or an MDT job in which an RLF occurs, the subscription condition corresponding to the attribute is: when a UE on which an RLF occurs is a UE indicated by the attribute, an RLF report needs to be reported.

In a third aspect, the present invention provides a device including a configuring unit, adapted to configure a subscription condition for an RLF report, for an IRPAgent. An obtaining unit is adapted to obtain an RLF report that is sent by the IRPAgent and satisfies the subscription condition configured by the configuring unit.

In a first preferred implementation of the third preferred aspect, the configuring unit is specifically adapted to: invoke a Create Management Object operation for the IRPAgent, for requesting the IRPAgent to create an RLF report subscription subcategory of a subnet category or a base station function category; and invoke a Set Management Object Attributes operation for the IRPAgent, for requesting the IRPAgent to configure an attribute of the created RLF report subscription subcategory to a value of an attribute corresponding to the subscription condition.

In a second preferred implementation of the first preferred implementation of the third preferred aspect, the obtaining unit is adapted to obtain, in a file transfer mechanism, the RLF report that is sent by the IRPAgent and satisfies the subscription condition.

In a third preferred implementation of the third preferred aspect, the configuring unit is adapted to invoke a Subscribe Log operation for the IRPAgent, for subscribing to the RLF report from the IRPAgent, and configure a filter condition of the Subscribe Log operation to the subscription condition.

In a fourth preferred implementation of the third preferred implementation of the third preferred aspect, the obtaining unit is adapted to obtain, in a notification log mechanism, the RLF report that is sent by the IRPAgent and satisfy the subscription condition.

In a fifth preferred implementation of the third preferred aspect, the configuring unit is adapted to invoke an Activate Signaling Trace Job operation for the IRPAgent, for requesting the IRPAgent to generate a signaling trace job. A job type of the signaling trace job is RLF reporting only. An input parameter of the Activate Signaling Trace Job operation is a value of an attribute corresponding to the subscription condition.

In a sixth preferred implementation of the fifth preferred implementation of the third preferred aspect, the obtaining unit is adapted to obtain, in a trace result reporting mechanism of a signaling trace job or a trace result reporting mechanism of a minimized drive test MDT job, the RLF report that is sent by the IRPAgent and satisfy the subscription condition.

In a seventh preferred implementation of any one of the implementations of the third preferred aspect above, the attribute corresponding to the subscription condition and configured by the configuring unit includes at least one of the following: area scope; time duration; RLF occurrence frequency; user equipment (UE) measurement item threshold; job identifier information of a signaling trace job or an MDT job in which an RLF occurs; and identifier information of a UE in a signaling trace job or an MDT job in which an RLF occurs.

In an eighth preferred implementation of any one of the implementations of the third preferred aspect above, the device is an integration reference point manager IRPManager.

In a fourth aspect, the present invention provides a device, includes a configuring unit adapted to configure a subscription condition for an RLF report subscribed to by an IRPManager. An obtaining unit is adapted to obtain, according to the subscription condition configured by the configuring unit, an RLF report that satisfies the subscription condition. A sending unit is adapted to send the RLF report that satisfies the subscription condition and is obtained by the obtaining unit to the IRPManager.

In a first preferred implementation of the fourth preferred aspect, the configuring unit is specifically adapted to: create an RLF report subscription subcategory of a subnet category or a base station function category according to a Create Management Object operation invoked by the IRPManager; and configure an attribute of the created RLF report subscription subcategory to a value of an attribute corresponding to the subscription condition.

In a second preferred implementation of the first preferred implementation of the fourth preferred aspect, the configuring unit is specifically adapted to subscribe to the RLF report for the IRPManager according to a Subscribe Log operation invoked by the IRPManager, and configure a filter condition of the Subscribe Log operation to the subscription condition.

In a third preferred implementation of the first preferred implementation of the fourth preferred aspect, the configuring unit is adapted to generate a signaling trace job according to an Activate Signaling Trace Job operation invoked by the IRPManager. A job type of the signaling trace job is RLF reporting only. The configuring unit is further adapted to configure a value of an attribute corresponding to the subscription condition as an input parameter of the Activate Signaling Trace Job operation.

In a fourth preferred implementation of the first preferred implementation of the fourth preferred aspect, the obtaining unit is adapted to query, according to the subscription condition, an obtained RLF report sent by a base station in an administrative domain of the device, and obtain the RLF report that satisfies the subscription condition. Alternatively, the obtaining unit is adapted to subscribe, according to the subscription condition, from a base station that satisfies the subscription condition in an administrative domain of the device, and obtain the RLF report that satisfies the subscription condition.

In a fifth preferred implementation of any one of the first and fourth implementation of the fourth preferred aspect, the sending unit is specifically adapted to send, in a file transfer mechanism, the RLF report that satisfies the subscription condition to the IRPManager.

In a sixth preferred implementation of any one of the second and fourth implementation of the fourth preferred aspect, the sending unit is specifically adapted to send, in a notification log mechanism, the RLF report that satisfies the subscription condition to the IRPManager.

In a seventh preferred implementation of any one of the third and fourth implementation of the fourth preferred aspect, the sending unit is specifically adapted to send, in a trace result reporting mechanism of a signaling trace job or a trace result reporting mechanism of a minimized drive test MDT job. The RLF report that satisfies the subscription condition to the IRPManager.

In an eighth preferred implementation of any one of the implementations of the fourth preferred aspect above, the attribute corresponding to the subscription condition and configured by the configuring unit includes at least one of the following: area scope; time duration; RLF occurrence frequency; user equipment (UE) measurement item threshold; job identifier information of a signaling trace job or an MDT job in which an RLF occurs; and identifier information of a UE in a signaling trace job or an MDT job in which an RLF occurs.

In a ninth preferred implementation of any one of the implementations of the fourth preferred aspect above, where the device is an integration reference point agent IRPAgent.

The above technical solutions can avoid the case in the prior art that a base station sends an RLF report obtained from a UE, to an IRPManager through an IRPAgent in a best-effort mode, thereby decreasing the load of information transferred between the IRPManager and the IRPAgent. Moreover, because the RLF report subscription is oriented to a specific management application, the IRPManager does not need to process redundant and useless RLF reports, thereby reducing the processing load of the IRPManager.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various communication systems, for example, a universal mobile telecommunications system (UMTS) system, a long term evolution (LTE) system, and so on.

The base station may be a base station controller, such as Radio Network Controller (RNC) in the UMTS system, or may be an evolved base station, such as Evolved NodeB (eNB or eNodeB) in the LTE system, and so on.

In the technical solutions of the present invention, an interface between an IRPManager and an IRPAgent is a northbound interface; the IRPAgent may be a base station or may be an independent entity, so that the base station may communicate with the IRPManager through the IRPAgent. The relationship between the IRPManager, the IRPAgent, and the base station is not described herein. For examples thereof, reference may be made to the 3GPP standard 32.101 or 32.102.

In addition, the term "and/or" herein indicates only an association relationship for describing associated objects, and represents that three relationships may exist. For example, A and/or B may represent the following three cases: A exists alone, both A and B exist, and B exists alone. In addition, the symbol "/" in this document usually represents that associated objects before and after the symbol are in an "or" relationship.

Figure 1:
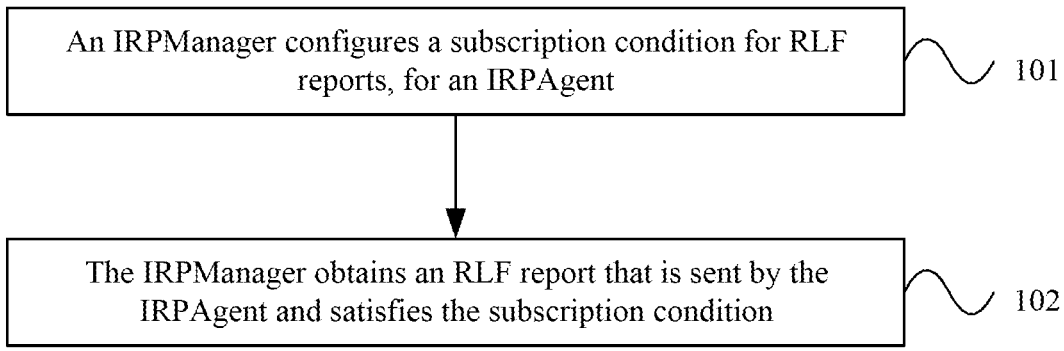
FIG. 1 is a schematic flowchart of a method for subscribing to an RLF report according to an embodiment of the present invention.

FIG. 1 is a schematic flowchart of a method for subscribing to an RLF report according to an embodiment of the present invention. As shown in FIG. 1, the method for subscribing to an RLF report in this embodiment may include the following:

101. An IRPManager configures a subscription condition for an RLF report, for an IRPAgent.

In this embodiment, an attribute corresponding to the subscription condition includes at least one of the following: area scope (AreaScope), time duration (TimeDuration), RLF occurrence frequency (OccurrenceFrequency), UE measurement item threshold (MeasurementThreshold), job identifier information of a signaling trace (Trace) job or a minimized drive test (MDT) job in which an RLF occurs, and identifier information of a UE in a Trace job or an MDT job in which an RLF occurs. Specific examples will be described below.

A. Area Scope

The attribute may indicate an area where an RLF report needs to be reported. The value of the attribute may include at least one piece of identifier information, for example, a cell identifier, or a tracking area (TA) identifier, where the identifier is applicable to the case where this embodiment is used in an LTE or evolved LTE system, and for another example, a routing area (RA) identifier or a location area (LA) identifier, where the RA identifier/LA identifier is applicable to the case where this embodiment is used in the UMTS system, for example, a wideband code division multiple access (WCDMA) system or a time division-synchronous code division multiple access (TD-SCDMA) system. The cell identifier may be an identifier of a cell, or may be identifiers of multiple cells (for example, an identifier list formed by multiple cell identifiers); the tracking area identifier may be an identifier of a tracking area, or may be identifiers of multiple tracking areas; the routing area identifier may be an identifier of a routing area, or may be identifiers of multiple routing areas; and the location area identifier may be an identifier of a location area, or may also be identifiers of multiple location areas. Optionally, the subscription condition corresponding to the attribute is:

when a UE on which an RLF occurs is located in the area scope indicated by the attribute, that is, when an RLF occurs on a UE in the area scope indicated by the attribute, an RLF report needs to be reported to an IRPManager. For example, if the attribute is the cell identifier of a cell, when a UE on which an RLF occurs is located in the cell, an IRPAgent should report the RLF report to the IRPManager. In addition, the attribute may be a default value, indicating the whole public land mobile network (Public Land Mobile Network, PLMN) scope.

B. Time Duration

The attribute may indicate a time duration in which an RLF report needs to be reported. The attribute may be marked by two time related variables, for example, the value of the attribute is made up of two time values, for example, start time and end time of absolute time, or is made up of a time value and a numeric value, for example, start time of absolute time and a duration. Optionally, the subscription condition corresponding to the attribute may be: when the RLF occurrence time is within the time duration indicated by the attribute, an RLF report needs to be reported to an IRPManager.

C. RLF Occurrence Frequency

The attribute may indicate a frequency of RLF occurrences at which an RLF report needs to be reported. The attribute may be marked by a time related variable and a variable related to the amount of RLF occurrences, for example, the value of the attribute is made up of a time value and a numeric value, such as a duration and the amount of RLF occurrences. Optionally, the subscription condition corresponding to the attribute may be: when an actual RLF occurrence frequency is higher than or equal to the frequency indicated by the attribute, an RLF report needs to be reported to an IRPManager. Assuming that the duration and the amount of RLF occurrences are 5 minutes and 1000 respectively, the indicated frequency is 1000 RLF events occurring within 5 minutes; the subscription condition is: when the amount of RLF occurrences within 5 minutes is greater than or equal to 1000, an RLF report needs to be reported to the IRPManager.

D. UE Measurement Item Threshold

Optionally, here the UE measurement item threshold may be a threshold of a UE measurement item threshold in an RLF report. The subscription condition corresponding to the attribute may be: when the measured value of the UE measurement item is non-compliant with the threshold indicated by the attribute, an RLF report needs to be reported to an IRPManager; here non-compliance may indicate different cases such as the measured value of the UE measurement item is smaller than or equal to the threshold indicated by the attribute.

The following describes the value of the attribute and the subscription condition corresponding to the attribute by using examples.

D-1. The value of the attribute is a threshold of reference signal received power (RSRP) of a source cell of a UE.

Optionally, the subscription condition corresponding to the attribute may be: when the UE measurement item is an RSRP value of the source cell of the UE, and the measured value of the UE measurement item is smaller than or equal to the threshold indicated by the attribute, an RLF report needs to be reported to the IRPManager.

D-2. The value of the attribute is a threshold of reference signal received quality (RSRQ) of a source cell of a UE.

Optionally, the subscription condition corresponding to the attribute may be: when the UE measurement item is an RSRQ value of the source cell of the UE, and the measured value of the UE measurement item is smaller than or equal to the threshold indicated by the attribute, an RLF report needs to be reported to the IRPManager.

D-3. The value of the attribute is a threshold of RSRP of a neighboring cell of the source cell of the UE.

Optionally, the subscription condition corresponding to the attribute may be: when the UE measurement item is an RSRP value of a neighboring cell of the source cell of the UE, and the measured value of the UE measurement item is smaller than or equal to the threshold indicated by the attribute, an RLF report needs to be reported to the IRPManager.

D-4. The value of the attribute is a threshold of RSRQ of a neighboring cell of the source cell of the UE.

Optionally, the subscription condition corresponding to the attribute may be: when the UE measurement item is an RSRQ value of a neighboring cell of the source cell of the UE, and the measured value of the UE measurement item is smaller than or equal to the threshold indicated by the attribute, an RLF report needs to be reported to the IRPManager.

It may be understood that the source cell may be a current cell where an RLF occurs.

Optionally, the measured value of the UE measurement item may be a UE measurement record in the RLF report.

E. Job identifier information of a Trace job or an MDT job in which an RLF occurs.

The attribute may indicate information of the job identifier allocated in the Trace job or MDT job to the UE on which an RLF occurs. The value of the attribute may be a trace reference value (TR), where the value may also be referred to as a trace job reference value.

The subscription condition corresponding to the attribute may be: when an RLF occurs in the Trace job or MDT job indicated by the attribute, an RLF report needs to be reported to the IRPManager.

F. Identifier information of a UE in a Trace job or an MDT job in which an RLF occurs.

The attribute may indicate information of the UE identifier allocated in the Trace job or MDT job to the UE on which an RLF occurs. The value of the attribute may be a combination of a TR and a trace recording session reference value (TRSR). In a management-based or area-based Trace or MDT job, the value of the attribute may be a combination of a TR, a TRSR, and a cell identifier.

The subscription condition corresponding to the attribute may be: when the UE on which an RLF occurs is the UE indicated by the attribute, an RLF report needs to be reported to the IRPManager.

In this embodiment, if multiple attributes are all configured, that is, values of multiple attributes are configured, the subscription condition is an intersection of subscription conditions corresponding to various attributes. To make the method provided by the embodiment of the present invention more comprehensible, the following uses two different scenarios as examples.

Scenario 1: When the IRPManager finds that a large number of "cell unavailable" alarms occur in an area (including following cells: Cell1, Cell2, and Cell3) between June 5 and June 7 in 2010, the IRPManager may subscribe to reports of RLFs whose occurrence frequency exceeds 1000 in cells Cell1, Cell2, and Cell3 between June 5 and June 7 in 2010, so as to provide assistance in analyzing the root cause of a radio network fault. For example, the subscription condition for an RLF report may be configured to: (AreaScope=Cell1 or Cell2 or Cell3) and (TimeDuration is in between {00:00:00, 2010-06-05} and {23:59:59, 2010-

06-07}) and (OccurrenceFrequency={5 minutes, 1000}). It may be understood that here "=" means that "the value is", which is not repeated hereinafter.

Scenario 2: After the IRPManager selects Cell1 and Cell2 for creating an immediate (Immediate) MDT job that requires periodic reporting, the IRPManager wishes to obtain RLF reports of RLFs that occur in the whole immediate MDT process, so as to perform background associated processing for the MDT report and RLF report. For example, the subscription condition for an RLF report may be configured to: (AreaScope=Cell1 and Cell2) and (TraceReference=TR1), where TR1 is information of a job identifier allocated to the immediate MDT job.

Optionally, the IRPManager in this embodiment may configure, in multiple mechanisms, the subscription condition for the RLF report, for the IRPAgent.

For example, first, the IRPManager may invoke a CreateMO (Create Management Object) operation for the IRPAgent, for requesting the IRPAgent to create an RLF report subscription (RLFReportingSubscription) subcategory of a subnet category or a base station function category; then the IRPManager may invoke a Set Management Object Attributes (SetMOAttributes) operation for the IRPAgent, for requesting the IRPAgent to configure an attribute of the created RLF report subscription subcategory to a value of an attribute corresponding to the subscription condition.

For another example, the IRPManager may also invoke a Subscribe Log (SubscribeLog) operation for the IRPAgent, for subscribing to the RLF report from the IRPAgent, and configure a filter condition of the Subscribe Log operation to the subscription condition. For example, a category of notifications reflecting an RLF event is added to a notification categories (NotificationCategories) parameter in the Subscribe Log operation.

For another example, the IRPManager may also invoke an Activate Signaling Trace Job (activateTraceJob) operation from a signaling trace job integration reference point (Trace IRP) for the IRPAgent, for requesting the IRPAgent to generate a signaling trace job. The job type of the signaling trace job is RLF reporting only, and an input parameter of the Activate Signaling Trace Job operation is a value of an attribute corresponding to the subscription condition. The operation invoked by the IRPManager is specifically an Activate Signaling Trace Job operation of the signaling trace job, where the signaling trace job is a management object of the IRPManager. It may be understood that, similar to an existing signaling trace job, the IRPAgent may further allocate a trace reference value and a trace recording session reference value to the generated signaling trace job, where the trace recording session reference value may be default without configuration.

102. The IRPManager obtains an RLF report that is sent by the IRPAgent and satisfies the subscription condition.

Optionally, the IRPManager may obtain, in multiple mechanisms, the RLF report that is sent by the IRPAgent and satisfies the subscription condition.

For example, the IRPManager may obtain, in a file transfer mechanism, the RLF report that is sent by the IRPAgent and satisfies the subscription condition. Optionally, the specific process is as follows. The IRPManager may receive a notification provided by the IRPAgent using a "notification file ready" function of a file transfer integration reference point, and read a subscription result file from a designated address. The file stores the RLF report that satisfies the subscription condition.

For another example, the IRPManager may obtain, in a notification log mechanism, the RLF report that is sent by the IRPAgent and satisfies the subscription condition. Optionally, the specific process is as follows. The IRPManager may invoke an Export Log Records (ExportLogRecords) operation or Get Log Records (GetLogRecords) operation for the IRPAgent and obtain a notification log. The notification log stores the RLF report that satisfies the subscription condition.

For another example, the IRPManager may also obtain, in a trace result reporting mechanism of a signaling trace job or a trace result reporting mechanism of an MDT job, the RLF report that is sent by the IRPAgent and satisfies the subscription condition. In this case, the IRPManager may store the obtained RLF report into a trace collection entity (TCE) of the IRPManager.

In this embodiment, an IRPManager configures a subscription condition for an RLF report, for an IRPAgent, so that the IRPManager can obtain an RLF report that is sent by the IRPAgent and satisfies the subscription condition, which can avoid the case in the prior art that a base station sends an RLF report obtained from a UE, to an IRPManager through an IRPAgent in a best-effort mode, thereby decreasing the load of information transferred between the IRPManager and the IRPAgent. Moreover, because the RLF report subscription is oriented to a specific management application, the IRPManager does not need to process redundant and useless RLF reports, thereby reducing the processing load of the IRPManager.

Optionally, the IRPAgent in this embodiment may obtain, before step 102, the RLF report that satisfies the subscription condition, which is not further described herein. For details, reference may be made to step 202 and its example in the embodiment shown in FIG. 2.

Figure 2:
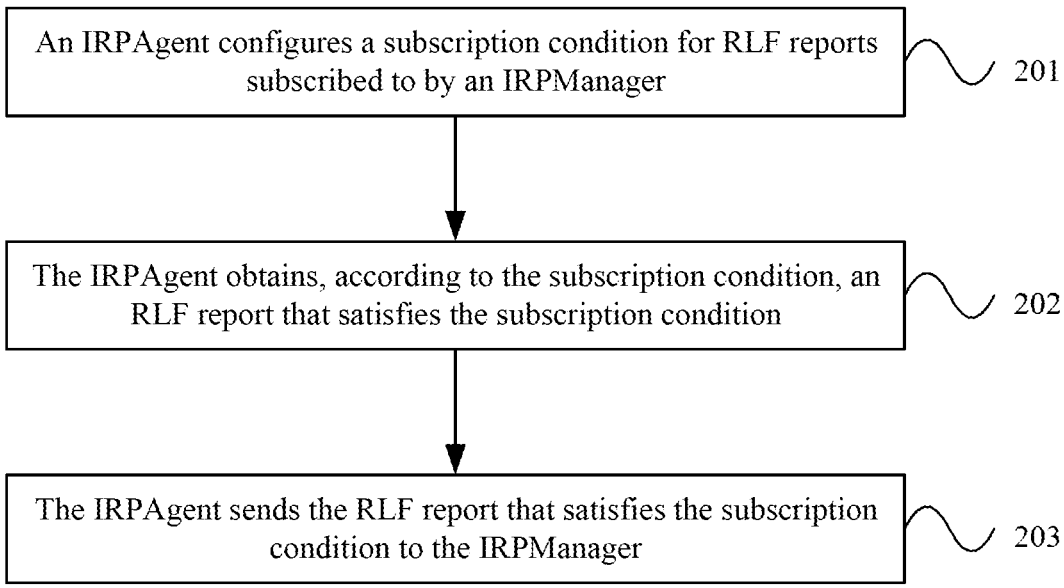
FIG. 2 is a schematic flowchart of a method for subscribing to an RLF report according to another embodiment of the present invention.

FIG. 2 is a schematic flowchart of a method for subscribing to an RLF report according to another embodiment of the present invention. As shown in FIG. 2, the method for subscribing to an RLF report in this embodiment may include the following:

201. An IRPAgent configures a subscription condition for an RLF report subscribed to by an IRPManager.

An attribute corresponding to the subscription condition may include at least one of the following: area scope (AreaScope), time duration (TimeDuration), RLF occurrence frequency (OccurrenceFrequency), UE measurement item threshold (MeasurementThreshold), job identifier information of a Trace job or an MDT job in which an RLF occurs, and identifier information of a UE in a Trace job or an MDT job in which an RLF occurs.

The attributes and subscription conditions corresponding to the attributes are not further described herein. For examples thereof, reference may be made to the related content in the embodiment corresponding to FIG. 1.

Optionally, the IRPAgent may configure, in multiple mechanisms, the subscription condition for an RLF report subscribed to by the IRPManager.

For example, first, the IRPAgent may create an RLF report subscription subcategory of a subnet category or a base station function category according to a Create Management Object operation invoked by the IRPManager; and then the IRPAgent may configure, according to a Set Management Object Attributes operation invoked by the IRPManager, an attribute of the created RLF report subscription subcategory to a value of an attribute corresponding to the subscription condition.

For another example, the IRPAgent may further subscribe to the RLF report for the IRPManager according to a Subscribe Log operation invoked by the IRPManager, and configure a filter condition of the Subscribe Log operation to the subscription condition. For example, a category of notifications reflecting an RLF event is added to a notification categories parameter in the Subscribe Log operation.

For another example, the IRPAgent may also generate a signaling trace job for the IRPManager according to an Activate Signaling Trace Job (activateTraceJob) operation invoked by the IRPManager, where the job type of the signaling trace job is RLF reporting only, and configure the value of the attribute corresponding to the subscription condition as an input parameter of the Activate Signaling Trace Job operation. It may be understood that, similar to an existing signaling trace job, the IRPAgent may further allocate a trace reference value (Trace Reference) and a trace recording session reference value (Trace Recording Session Reference) to the generated signaling trace job, where the trace recording session reference value may be default without configuration.

202. The IRPAgent obtains, according to the subscription condition, an RLF report that satisfies the subscription condition.

Optionally, the IRPAgent may obtain, in multiple mechanisms according to the subscription condition, the RLF report that satisfies the subscription condition.

For example, the IRPAgent queries, according to the subscription condition, an obtained RLF report sent by a base station in an administrative domain of the IRPAgent. The IRPAgent obtains the RLF report that satisfies the subscription condition. The base station may be understood as a source base station; the source base station sends all obtained RLF reports to the corresponding IRPAgent. The IRPAgent queries, according to the subscription condition, the obtained RLF reports sent by the base station in the administrative domain of the IRPAgent, and obtains the RLF report that satisfies the subscription condition.

For another example, the IRPAgent subscribes, according to the subscription condition, from a base station that satisfies the subscription condition in the administrative domain of the IRPAgent, and obtains the RLF report that satisfies the subscription condition. The base station may be understood as a source base station, or may be understood as a target base station. The base station sends, according to the subscription condition of the IRPAgent, the RLF report that satisfies the subscription condition to the corresponding IRPAgent; and the IRPAgent obtains the RLF report that satisfies the subscription condition.

The following describes how to query the RLF reports and obtain the RLF report that satisfies the subscription condition by using an example.

The content of the RLF report may include but is not limited to at least one of the following. The content of the RLF report may include a measured value of RSRP/RSRQ of the source cell of the UE when an RLF occurs. The content of the RLF report may include a measured value of RSRP/RSRQ of a neighboring cell of the source cell of the UE when an RLF occurs. The neighboring cell may be any one of the following: an intra-frequency neighboring cell, an inter-frequency neighboring cell, and an inter-system neighboring cell. The content of the RLF report may include UE location information. The content of the RLF report may include a serving cell identifier of the UE. The serving cell identifier may include but is not limited to at least one of a cell global identifier (CGI) of a cell where an RLF occurs on the UE, a cell (target cell) where the UE reestablishes an RRC connection, and a CGI of a cell before a handover of the UE. The content of the RLF report may include a job identifier information of a signaling trace job or an MDT job in which an RLF occurs, for example, a TR. The content of the RLF report may include a identifier information of the UE in a signaling trace job or an MDT job in which an RLF occurs, for example, a combination of a TR and a TRSR.

The IRPAgent or base station may query the obtained RLF reports to see which RLF reports satisfy the subscription condition, and report the RLF reports. For example, according to the time of obtaining the RLF reports, the IRPAgent or base station estimates the RLF occurrence time, and determines whether the RLF reports satisfy the subscription condition corresponding to attribute A. The time obtained by advancing the time of obtaining RLF reports by a duration (such as 4 s) may be used as the estimated RLF occurrence time. For another example, the IRPAgent or base station makes statistics according to the obtained RLF reports, for example, makes statistics of the actual occurrence frequency of an RLF event in the base station or cell scope, and determines whether the subscription condition corresponding to attribute D is satisfied. For another example, in the case that an RLF occurs in a signaling trace job or an MDT job, the IRPAgent or base station judges the obtained RLF reports; when the job identifier information in an RLF report is the same as the value of attribute E or falls within the value range of attribute E, the RLF report satisfies the subscription condition corresponding to attribute E. For another example, in the case that an RLF occurs in a signaling trace job or an MDT job, the IRPAgent or base station judges the obtained RLF reports; when the UE identifier in an RLF report is the same as the value of attribute F or falls within the value range of attribute F, the RLF report satisfies the subscription condition corresponding to attribute F.

203. The IRPAgent sends the RLF report that satisfies the subscription condition to the IRPManager.

Optionally, the IRPAgent may send, in multiple mechanisms, the RLF report that satisfies the subscription condition to the IRPManager.

For example, the IRPAgent may send, in a file transfer mechanism, the RLF report that satisfies the subscription condition to the IRPManager. That is, the IRPAgent sends, through a file transfer integration reference point, the RLF report that satisfies the subscription condition to the IRPManager. Optionally, the specific process is as follows: After the IRPAgent obtains the RLF report that satisfies the subscription condition, the IRPAgent may store the RLF report that satisfies the subscription into a file, and notify the IRPManager by using a "notification file ready" function of the file transfer integration reference point; and the IRPManager reads a subscription result file from a designated address.

For another example, the IRPAgent may send, in a notification log mechanism, the RLF report that satisfies the subscription condition to the IRPManager. That is, the IRPAgent sends, by using a function of a notification log integration reference point, the RLF report that satisfies the subscription condition to the IRPManager. Optionally, the specific process is as follows: After the IRPAgent obtains the RLF report that satisfies the subscription condition, the IRPAgent may store the RLF report that satisfies the subscription condition into a notification log, and send the notification log to the IRPManager according to an Export Log Records (ExportLogRecords) operation or a Get Log Records (GetLogRecords) operation invoked by the IRPManager.

For another example, the IRPAgent may also send, in a trace result reporting mechanism of a signaling trace job or a trace result reporting mechanism of an MDT job, the RLF report that satisfies the subscription condition to the IRPManager. In this case, the IRPManager further stores the obtained RLF report into a TCE of the IRPManager.

In this embodiment, the IRPAgent configures the subscription condition for an RLF report subscribed to by the IRPManager so that the IRPAgent can obtain, according to the subscription condition, an RLF report that satisfies the subscription condition and send the RLF report to the IRPManager, which can avoid the case in the prior art that a base station sends an RLF report obtained from a UE, to an IRPManager through an IRPAgent in a best-effort mode, thereby decreasing the load of information transferred between the IRPManager and the IRPAgent. Moreover, because the RLF report subscription is oriented to a specific management application, the IRPManager does not need to process redundant and useless RLF reports, thereby reducing the processing load of the IRPManager.

It should be noted that, for ease of description, the foregoing method embodiments are all described as a series of actions. Persons skilled in the art should understand that the present invention is not limited to the sequence of actions described herein, and that according to the present invention, some steps may be performed in other sequences or at the same time. Persons skilled in the art should also know that the embodiments in the specification are exemplary embodiments and that actions and modules involved in these embodiments are not necessarily required for the present invention.

In the foregoing embodiments, the description in each embodiment has its own focus. For the part that is not described in a certain embodiment, reference may be made to relevant descriptions in other embodiments.

Figure 3:
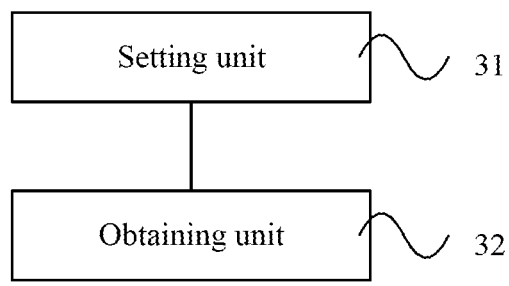
FIG. 3 is a schematic structural diagram of a device according to another embodiment of the present invention.

FIG. 3 is a schematic structural diagram of a device according to another embodiment of the present invention. As shown in FIG. 3, the device in this embodiment may include a configuring unit 31 and an obtaining unit 32. The configuring unit 31 is adapted to configure a subscription condition for an RLF report, for an IRPAgent. The obtaining unit 32 is adapted to obtain an RLF report that is sent by the IRPAgent and satisfy the subscription condition configured by the configuring unit 31.

The device provided by this embodiment may be but is not limited to the IRPManager.

Any function of the IRPManager in the embodiment corresponding to FIG. 1 and FIG. 2 may be implemented by the device provided by this embodiment.

Optionally, the configuring unit 31 in this embodiment may invoke a Create Management Object operation for the IRPAgent, for requesting the IRPAgent to create an RLF report subscription subcategory of a subnet category or a base station function category; and invoke a Set Management Object Attributes operation for the IRPAgent, for requesting the IRPAgent to configure an attribute of the created RLF report subscription subcategory to a value of an attribute corresponding to the subscription condition. Optionally, the obtaining unit 32 in this embodiment may be specifically adapted to obtain, in a file transfer mechanism, the RLF report that is sent by the IRPAgent and satisfies the subscription condition.

Optionally, the configuring unit 31 in this embodiment may further invoke a Subscribe Log operation for the IRPAgent, for subscribing to the RLF report from the IRPAgent, and configure a filter condition of the Subscribe Log operation to the subscription condition. Optionally, the obtaining unit 32 in this embodiment may be specifically further adapted to obtain, in a notification log mechanism, the RLF report that is sent by the IRPAgent and satisfies the subscription condition.

Optionally, the configuring unit 31 in this embodiment may further invoke an Activate Signaling Trace Job (activateTraceJob) operation from a signaling trace job integration reference point (Trace IRP) for the IRPAgent, for requesting the IRPAgent to generate a signaling trace job. The job type of the signaling trace job is RLF reporting only. An input parameter of the Activate Signaling Trace Job operation is a value of an attribute corresponding to the subscription condition. The operation invoked by the IRPManager may be an Activate Signaling Trace Job operation of the signaling trace job. The signaling trace job is a management object of the IRPManager. Optionally, the obtaining unit 32 in this embodiment may be specifically further adapted to obtain, in a trace result reporting mechanism of a signaling trace job or a trace result reporting mechanism of an MDT job, the RLF report that is sent by the IRPAgent and satisfies the subscription condition.

The attribute corresponding to the subscription condition configured by the configuring unit 31 may include at least one of the following: area scope, time duration, RLF occurrence frequency, UE measurement item threshold, job identifier information of a Trace job or an MDT job in which an RLF occurs, and identifier information of a UE in a Trace job or an MDT job in which an RLF occurs.

The attributes and subscription conditions corresponding to the attributes are not further described herein. For examples thereof, reference may be made to the related content in the embodiment corresponding to FIG. 1.

In the device provided by this embodiment, a configuring unit configures a subscription condition for an RLF report, for an IRPAgent, so that an obtaining unit can obtain an RLF report that is sent by the IRPAgent and satisfies the subscription condition, which can avoid the case in the prior art that a base station sends an RLF report obtained from a UE, to an IRPManager through an IRPAgent in a best-effort mode, thereby decreasing the load of information transferred between the IRPManager and the IRPAgent. Moreover, because the RLF report subscription is oriented to a specific management application, the IRPManager does not need to process redundant and useless RLF reports, thereby reducing the processing load of the IRPManager.

Figure 4:
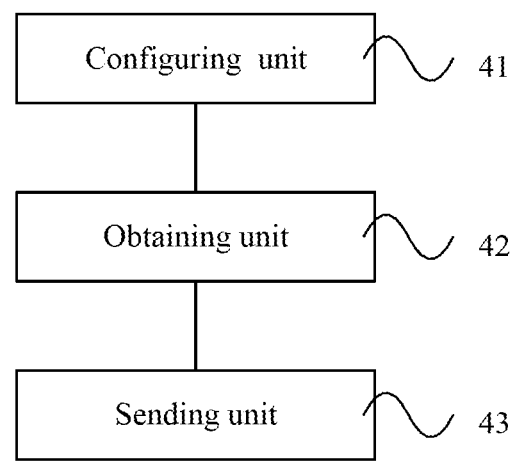
FIG. 4 is a schematic structural diagram of a device according to another embodiment of the present invention.

FIG. 4 is a schematic structural diagram of a device according to another embodiment of the present invention. As shown in FIG. 4, the device in this embodiment may include a configuring unit 41, an obtaining unit 42, and a sending unit 43. The configuring unit 41 is adapted to configure a subscription condition for an RLF report subscribed to by an IRPManager. The obtaining unit 42 is adapted to obtain, according to the subscription condition configured by the configuring unit 41, an RLF report that satisfies the subscription condition; and the sending unit 43 is adapted to send the RLF report that satisfies the subscription condition and is obtained by the obtaining unit 42 to the IRPManager.

The device provided by this embodiment may be but is not limited to the IRPAgent.

Any function of the IRPAgent in the embodiment corresponding to FIG. 1 and FIG. 2 may be implemented by the device provided by this embodiment.

Optionally, the configuring unit 41 in this embodiment may specifically create an RLF report subscription subcategory of a subnet category or a base station function category according to a Create Management Object operation invoked by the IRPManager; and configure, according to a Set Management Object Attributes operation invoked by the IRPManager, an attribute of the created RLF report subscription subcategory to a value of an attribute corresponding to the subscription condition. Optionally, the sending unit 43 in this embodiment may be specifically adapted to send, in a file transfer mechanism, the RLF report that satisfies the subscription condition to the IRPManager.

Optionally, the configuring unit 41 in this embodiment may further specifically subscribe to the RLF report for the IRPManager according to a Subscribe Log operation invoked by the IRPManager, and configure a filter condition of the Subscribe Log operation to the subscription condition. Optionally, the sending unit 43 in this embodiment may be specifically adapted to send, in a notification log mechanism, the RLF report that satisfies the subscription condition to the IRPManager.

Optionally, the configuring unit 41 in this embodiment may be specifically further adapted to generate a signaling trace job according to an Activate Signaling Trace Job (activateTraceJob) operation invoked by the IRPManager, where the job type of the signaling trace job is RLF reporting only, and configure an input parameter of the Activate Signaling Trace Job operation to a value of an attribute corresponding to the subscription condition. Optionally, the sending unit 43 in this embodiment may be specifically further adapted to send, in a trace result reporting mechanism of a signaling trace job or a trace result reporting mechanism of an MDT job, the RLF report that satisfies the subscription condition to the IRPManager.

The attribute corresponding to the subscription condition configured by the configuring unit may include at least one of the following: area scope, time duration, RLF occurrence frequency, UE measurement item threshold, job identifier information of a Trace job or a minimized drive test MDT job in which an RLF occurs, and identifier information of a UE in a Trace job or an MDT job in which an RLF occurs.

The attributes and subscription conditions corresponding to the attributes are not further described herein. For examples thereof, reference may be made to the related content in the embodiment corresponding to FIG. 1.

Specifically, the obtaining unit 42 in this embodiment may query, according to the subscription condition, obtained RLF reports sent by a base station in an administrative domain of the device, and obtain the RLF report that satisfies the subscription condition; or subscribe, according to the subscription condition, from a base station that satisfies the subscription condition in an administrative domain of the device, and obtain the RLF report that satisfies the subscription condition.

In the device provided by this embodiment, a configuring unit configures a subscription condition for an RLF report subscribed to by an IRPManager, so that an obtaining unit can obtain, according to the subscription condition, an RLF report that satisfies the subscription condition, and a sending unit sends the RLF report to the IRPManager, which can avoid the case in the prior art that a base station sends an RLF report obtained from a UE, to an IRPManager through an IRPAgent in a best-effort mode, thereby decreasing the load of information transferred between the IRPManager and the IRPAgent. Moreover, because the RLF report subscription is oriented to a specific management application, the IRPManager does not need to process redundant and useless RLF reports, thereby reducing the processing load of the IRPManager.

It may be clearly learned by persons skilled in the art that, to achieve the purpose of convenient and brief description, for a detailed working process of the foregoing devices and units, reference may be made to the corresponding process in the foregoing method embodiments, which is not described herein again.

In the several embodiments provided in this application, it should be understood that the disclosed system, device, and method may be implemented in other manners. For example, the foregoing described device embodiments are merely exemplary. For example, the unit division is merely a logical function division and may be other divisions in actual implementation. For example, multiple units or components can be combined or integrated into another system, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may be implemented in a form of hardware plus a software functional module.

The integrated unit implemented in the form of software functional unit may be stored in a computer readable storage medium. The software functional unit is stored in a storage medium, and contains several instructions used to instruct computer equipment (for example, a personal computer, a server, or network equipment) to perform a part of the steps of the methods according to the embodiments of the present invention. The foregoing storage medium includes: any medium that can store program codes, such as a USB flash disk, a removable hard disk, a read-only memory (ROM), a random access memory (RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof as long as such modifications and replacements do not cause the essence of the corresponding technical solutions to depart from the scope of the technical solutions of the embodiments of the present invention.

What is claimed is:

1. A method for subscribing to a radio link failure (RLF) report, comprising:

requesting, through a northbound interface and by an integration reference point manager (IRPManager), an integration reference point agent (IRPAgent) to generate a signaling trace job according to an active signaling trace job operation, wherein a job type of the signaling trace job is radio link failure (RLF) reporting only, and wherein an input parameter of the activate signaling trace job operation is a value of an attribute corresponding to a subscription condition of the RLF report; and receiving, by a receiver of the IRPManager, the RLF report that is sent by the IRPAgent and that satisfies the subscription condition;

wherein a mechanism of receiving, by the IRPManager, the RLF report that is sent by the IRPAgent and satisfies the subscription condition comprises a trace result reporting mechanism of a signaling trace job or a trace result reporting mechanism of a minimized drive test (MDT) job;

wherein the subscription condition comprises area scope; and wherein the value of the attribute comprises at least one of the following: an identifier of one or more cells, a tracking area identifier, a routing area identifier, and a location area identifier.

2. The method according to claim 1, where in the subscription condition further comprising reporting a RLF report when an RLF occurs on a UE in an area indicated by the attribute.

3. An integration reference point manager (IRPManager), comprising:

a processor;

a computer-readable storage medium storing a program to be executed by the processor, the program including instructions for:

requesting, through a northbound interface, an integration reference point agent (IRPAgent) to generate a signaling trace job according to an activate signaling trace job operation, wherein a job type of the signaling trace job is radio link failure (RLF) reporting only, and wherein an input parameter of the activate signaling trace job operation is a value of an attribute corresponding to a subscription condition of the RLF report; and a receiver, configured to receive the RLF report that is sent by the IRPAgent and satisfies the subscription condition;

wherein a mechanism of obtaining, by the IRPManager, the RLF report that is sent by the IRPAgent and satisfies the subscription condition comprises a trace result reporting mechanism of a signaling trace job or a trace result reporting mechanism of a minimized drive test (MDT) job;

wherein the subscription condition comprises area scope; and wherein the value of the attribute comprises at least one of the following: an identifier of one or more cells, a tracking area identifier, a routing area identifier, and a location area identifier.

4. The IRPManager according to claim 3, wherein the subscription condition further comprises reporting a RLF report when an RLF occurs on a UE in an area indicated by the attribute.

* * * * *